(12) United States Patent
Kim et al.

(10) Patent No.: US 8,145,989 B2
(45) Date of Patent: Mar. 27, 2012

(54) SYSTEM AND METHOD FOR PROVIDING CONTINUOUS DOWNLOADING SERVICE OF LARGE SIZE CONTENTS THROUGH WIRELESS NETWORK AND COMPUTER READABLE MEDIUM FOR REALIZING THE SAME

(75) Inventors: Sung-Woo Kim, Seoul (KR); In-Wook Seo, Seoul (KR); Gap-Chun Back, Seoul (KR)

(73) Assignee: KT Corporation, Seoul (KR)

( * ) Notice: Subject to any disclaimer, the term of this patent is extended or adjusted under 35 U.S.C. 154(b) by 739 days.

(21) Appl. No.: 11/725,229

(22) Filed: Mar. 16, 2007

(65) Prior Publication Data

US 2007/0208829 A1 Sep. 6, 2007

Related U.S. Application Data

(63) Continuation of application No. PCT/KR2006/001398, filed on Apr. 14, 2006.

(30) Foreign Application Priority Data

Apr. 15, 2005 (KR) .................. 10-2005-0031233

(51) Int. Cl.
*G06F 17/30* (2006.01)
(52) U.S. Cl. ...................................................... 715/200
(58) Field of Classification Search .................. 715/200
See application file for complete search history.

(56) References Cited

U.S. PATENT DOCUMENTS

| 5,349,678 A | 9/1994 | Morris et al. |
| 5,410,543 A | 4/1995 | Seitz et al. |
| 6,072,493 A | 6/2000 | Driskell et al. |
| 6,493,871 B1 | 12/2002 | Welch et al. |
| 6,259,586 B1 | 3/2003 | Hori |
| 6,529,581 B2 | 3/2003 | Hori |
| 6,529,586 B1 | 3/2003 | Elvins et al. |

(Continued)

FOREIGN PATENT DOCUMENTS

JP 1998-133881 A 5/1998

(Continued)

OTHER PUBLICATIONS

International Search Report for International Application No. PCT/KR2006/001398 dated Jul. 10, 2006 by Korean Intellectual Property Office.

(Continued)

*Primary Examiner* — Laurie Ries
*Assistant Examiner* — Tionna Smith
(74) *Attorney, Agent, or Firm* — Knobbe, Martens, Olson & Bear LLP

(57) ABSTRACT

A method of providing a continuous downloading service of large size content through a wireless network consisting of a mobile terminal and a content server is disclosed. In one aspect, the method comprises receiving a request; receiving a package list from the mobile terminal; comparing information of an individual file in the received package list and information of an individual file in the content server; and transmitting a required file list indicating at least one individual file having different information in the received package list and the stored package list to the mobile terminal, wherein the required file list comprises a content unified version. A download program installed in the mobile terminal receives the required file list and determines the continuous download.

16 Claims, 12 Drawing Sheets

U.S. PATENT DOCUMENTS

| | | | |
|---|---|---|---|
| 6,675,382 B1 | 1/2004 | Foster | |
| 6,839,744 B1 | 1/2005 | Kloba et al. | |
| 6,970,849 B1 | 11/2005 | DeMello et al. | |
| 7,039,177 B1 | 5/2006 | Smith et al. | |
| 7,155,517 B1 | 12/2006 | Koponen et al. | |
| 7,171,477 B2 | 1/2007 | Hori et al. | |
| 7,304,984 B2 | 12/2007 | Butler et al. | |
| 7,363,035 B2 | 4/2008 | Reilly | |
| 7,583,801 B2 | 9/2009 | Terekhova et al. | |
| 7,593,686 B1 | 9/2009 | Knoop | |
| 7,739,413 B2 | 6/2010 | Dewa et al. | |
| 7,805,719 B2 | 9/2010 | O'Neill | |
| 2001/0029605 A1 | 10/2001 | Forbes et al. | |
| 2002/0131404 A1 | 9/2002 | Mehta et al. | |
| 2003/0110044 A1 | 6/2003 | Nix et al. | |
| 2003/0195974 A1 | 10/2003 | Ronning et al. | |
| 2004/0054650 A1* | 3/2004 | Chun | 707/1 |
| 2004/0166834 A1 | 8/2004 | Omar et al. | |
| 2004/0194069 A1 | 9/2004 | Surasinghe | |
| 2005/0033728 A1 | 2/2005 | James et al. | |
| 2005/0037740 A1 | 2/2005 | Smith et al. | |
| 2005/0043020 A1 | 2/2005 | Lipsanen et al. | |
| 2005/0153741 A1* | 7/2005 | Chen et al. | 455/558 |
| 2005/0192878 A1 | 9/2005 | Minear et al. | |
| 2005/0282490 A1* | 12/2005 | Nurmi | 455/11.1 |
| 2006/0107327 A1 | 5/2006 | Sprigg et al. | |
| 2006/0224943 A1* | 10/2006 | Snyder et al. | 715/501.1 |
| 2007/0106745 A1 | 5/2007 | Sakoh et al. | |
| 2007/0171880 A1 | 7/2007 | Ismail | |

FOREIGN PATENT DOCUMENTS

| | | |
|---|---|---|
| JP | 1998-240602 | 9/1998 |
| JP | 1999-065828 A | 3/1999 |
| JP | 2001-273147 A | 10/2001 |
| JP | 2001-300144 | 10/2001 |
| JP | 2002-169822 | 6/2002 |
| JP | 2002-189601 A | 7/2002 |
| JP | 2002-342290 A | 11/2002 |
| JP | 2002-540492 A | 11/2002 |
| JP | 2003-005883 A | 1/2003 |
| JP | 2003-141419 A | 5/2003 |
| JP | 2003-162414 | 6/2003 |
| JP | 2004-030189 A | 1/2004 |
| JP | 2004-86409 A | 3/2004 |
| JP | 2004-113490 A | 4/2004 |
| JP | 2004-512578 A | 4/2004 |
| JP | 2004-164299 A | 6/2004 |
| JP | 2005-011148 | 1/2005 |
| JP | 2005-011218 A | 1/2005 |
| JP | 2005-100435 | 4/2005 |
| KR | 10-2000-0054477 A | 9/2000 |
| KR | 2002-0003541 | 1/2002 |
| KR | 2002-0067248 | 8/2002 |
| KR | 2003-0030586 | 4/2003 |
| KR | 10-389093 | 6/2003 |
| KR | 2003-073855 | 9/2003 |
| KR | 2004-009097 | 1/2004 |
| KR | 2004-0032010 | 4/2004 |
| KR | 2004-093583 | 11/2004 |
| KR | 2004-0096332 | 11/2004 |
| KR | 2005-001174 | 1/2005 |
| WO | WO 00/33193 A1 | 6/2000 |
| WO | WO 02/41147 A1 | 5/2002 |
| WO | WO 2004/111905 A1 | 12/2004 |

OTHER PUBLICATIONS

Japanese Office Action for Japanese Application No. 2007-533409 dated Dec. 14, 2009 by Japanese Patent Office Abstract.
International Search Report for International Application No. PCT/KR2006/001369 dated Jul. 24, 2006 by Korean Intellectual Property Office.
Office Action for U.S. Appl. No. 11/801,079 dated Mar. 5, 2009 by U.S. Patent and Trademark Office.
Final Office Action for U.S. Appl. No. 11/801,079 dated Aug. 28, 2009 by U.S. Patent and Trademark Office.
Office Action for U.S. Appl. No. 11/724,698 dated Oct. 28, 2009 by U.S. Patent and Trademark Office.
Final Office Action for U.S. Appl. No. 11/724,698 dated Apr. 30, 2010 by U.S Patent and Trademark Office.
Keiichi Yamachika, Q&A on Windows 2000 Service Pack 1 Basics. Windows 2000 World, Japan, IDG Japan Co., Ltd., Jan. 1, 2001.
Michihiko Takeuchi, Egg-powered Linuxer, Linux Magazine, Japan, USKY Co., Ltd., Feb. 1, 2005, vol. 7, Issue 2, pp. 148-153.
Office Action for U.S. Appl. No. 11/724,698 dated Oct. 6, 2010.
Pawlak, Peter, Innovation of Software Update with Windows Update Services, Directions on Microsoft, Japan, Media Select Co., Ltd., Mar. 16, 2005, vol. 1, Issue 12, pp. 39-48.
European Search Report dated Jul. 29, 2010.
Notice of Allowance relating to U.S. Appl. No. 11/724,698 dated Jun. 21, 2011.
Japanese Office Action dated Oct. 12, 2010.
United States Office Action in U.S. Appl. No. 11/801,079 dated Nov. 17, 2011.

* cited by examiner

[Figure 1]
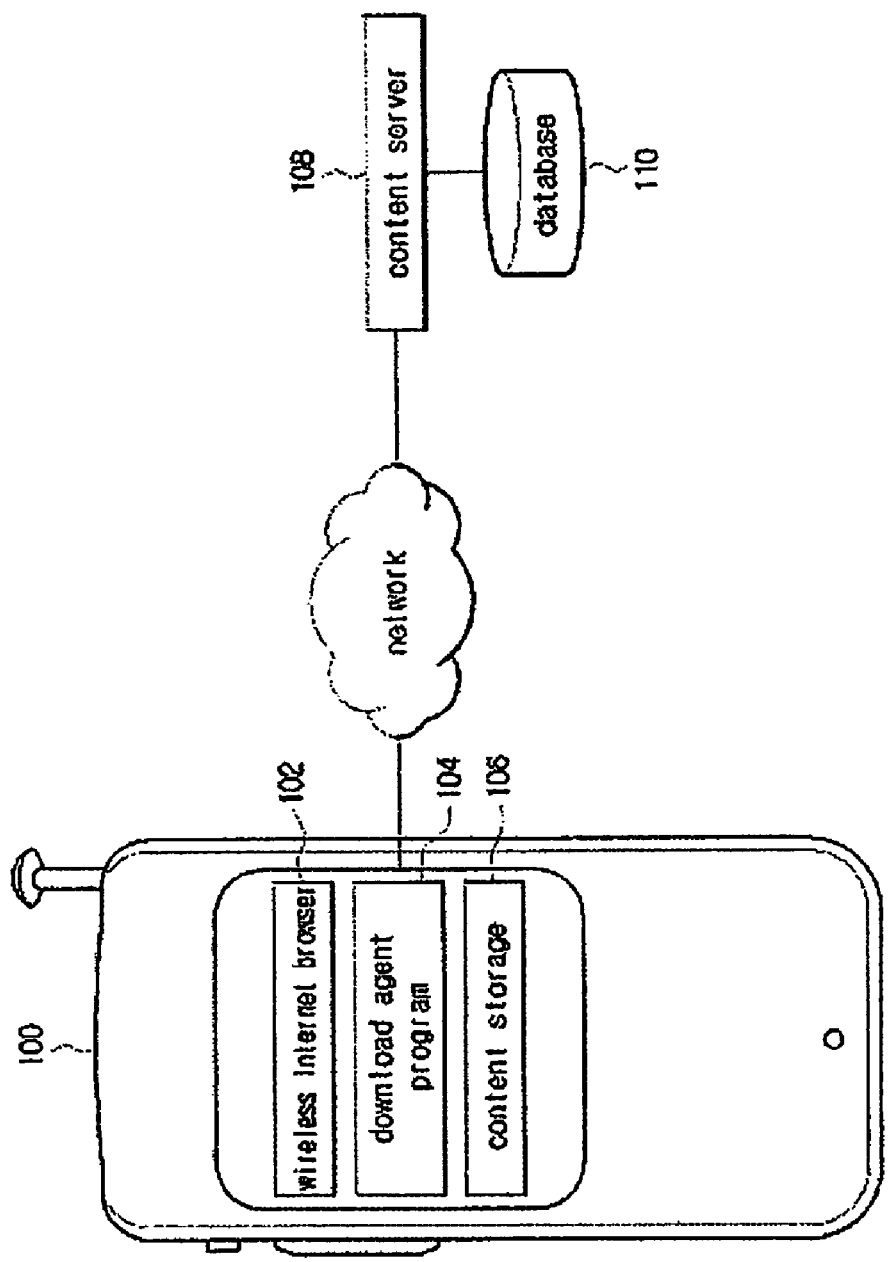

[Figure 2]
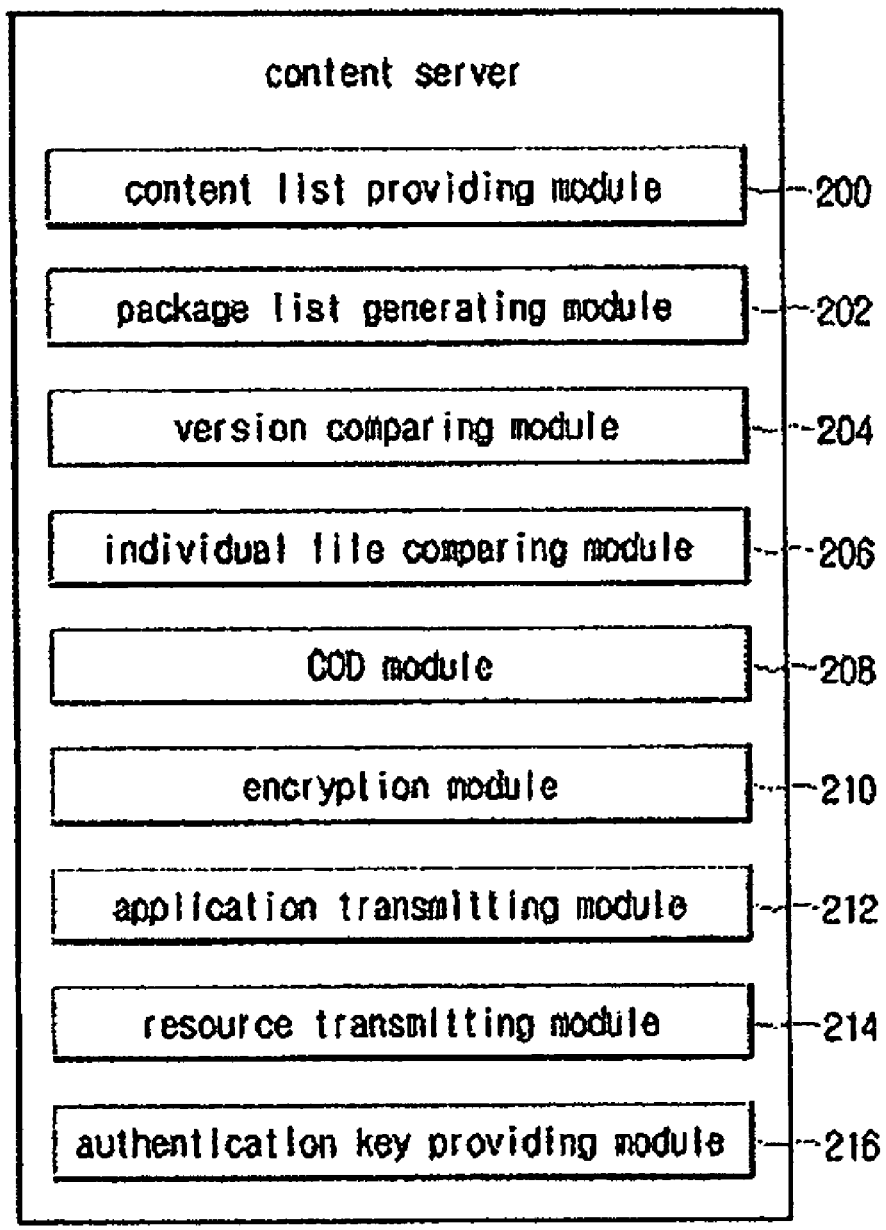

[Figure 3]
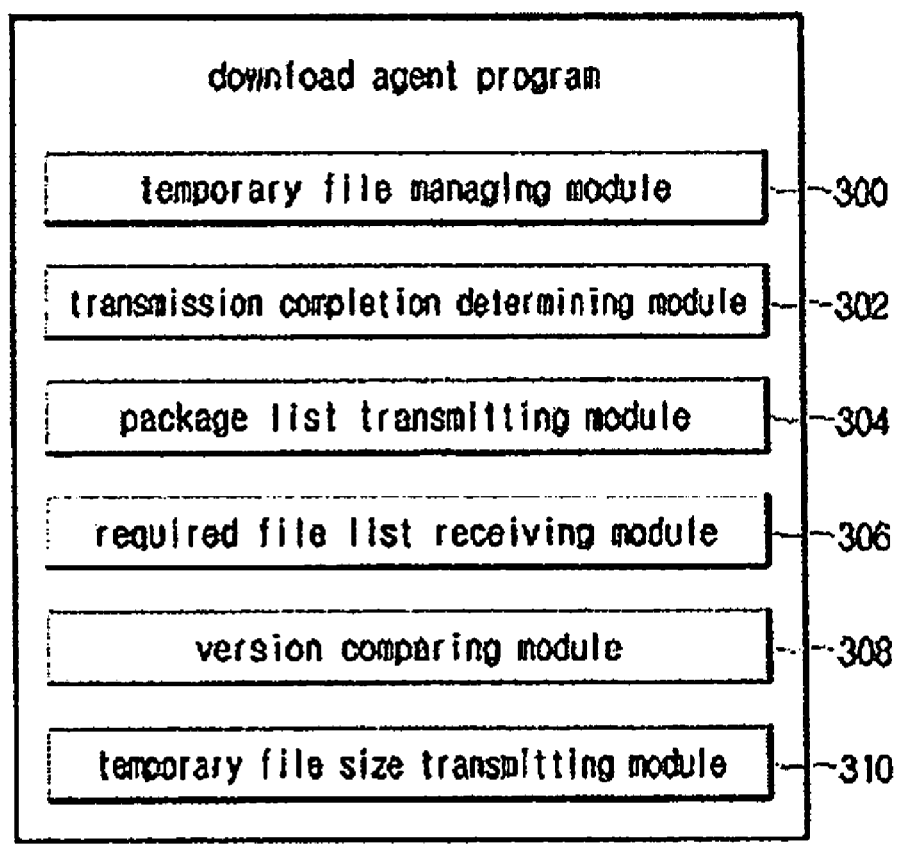

[Figure 4]

| content master ID |
|---|
| content unified version |
| number of executable files |
| configuration data of executable file |
| number of DLL files |
| configuration data of DLL file |
| number of resource files |
| configuration data of resource file |
| number of item files |
| configuration data of item file |

[Figure 5]

| executable file ID | actual file name | version data | size | billing data |

[Figure 6]
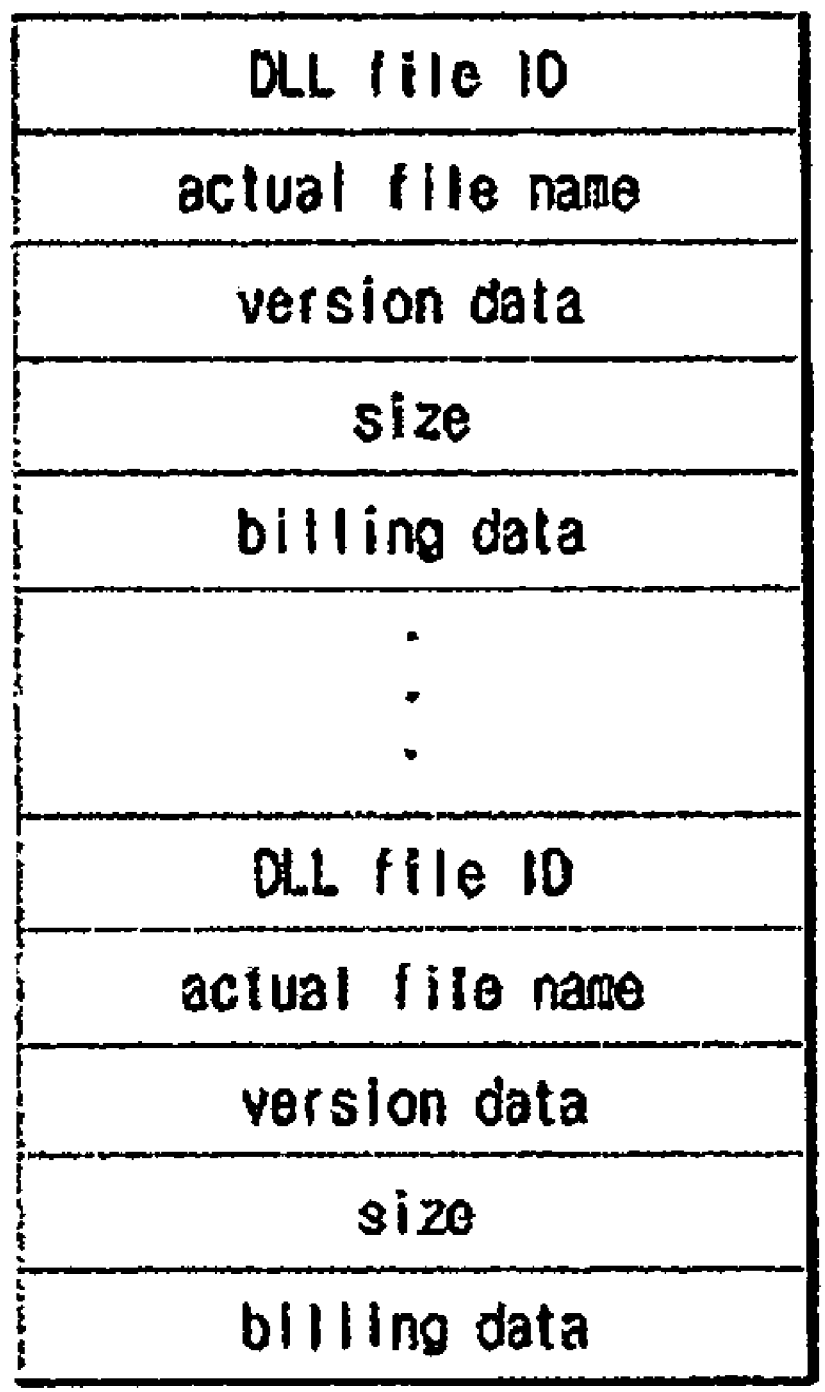

[Figure 7]
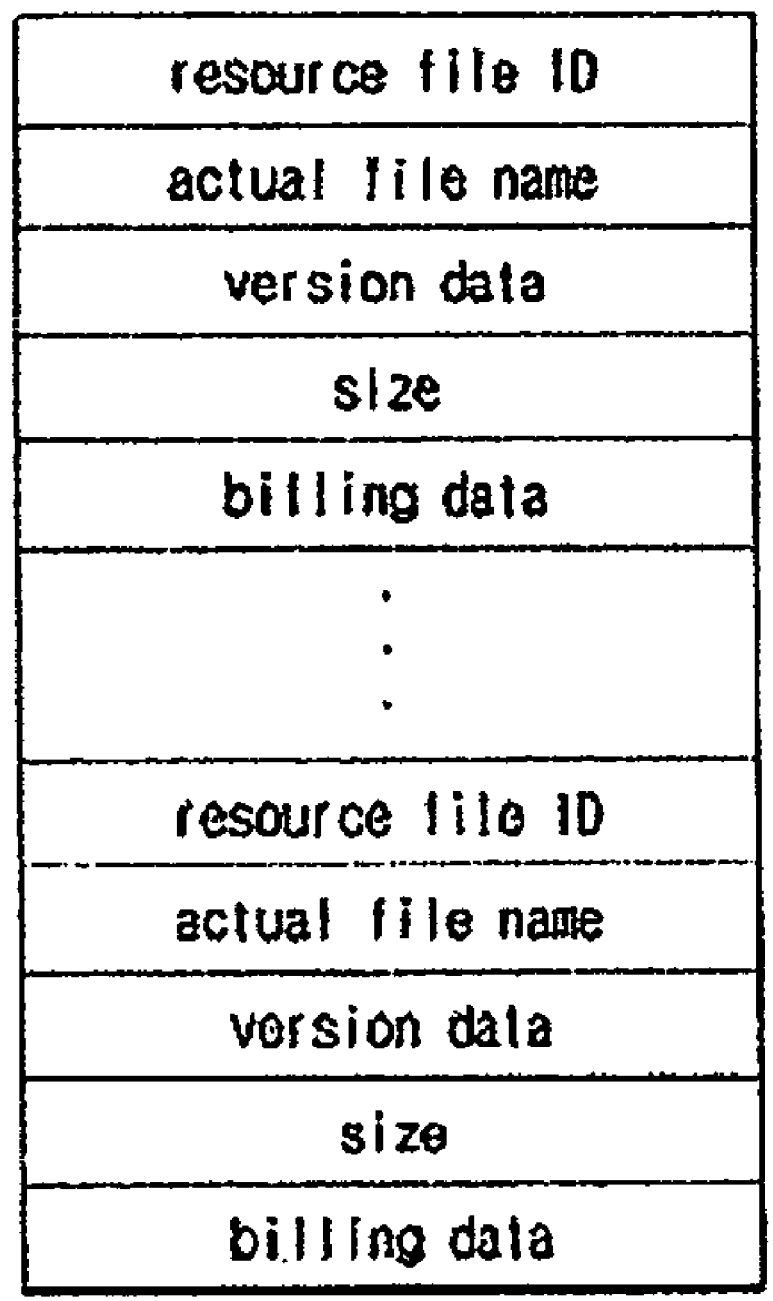

[Figure 8]

| Item file ID |
| --- |
| actual file name |
| version data |
| size |
| billing data |
| ⋮ |
| Item file ID |
| actual file name |
| version data |
| size |
| billing data |

[Figure 9]

[Figure 10]
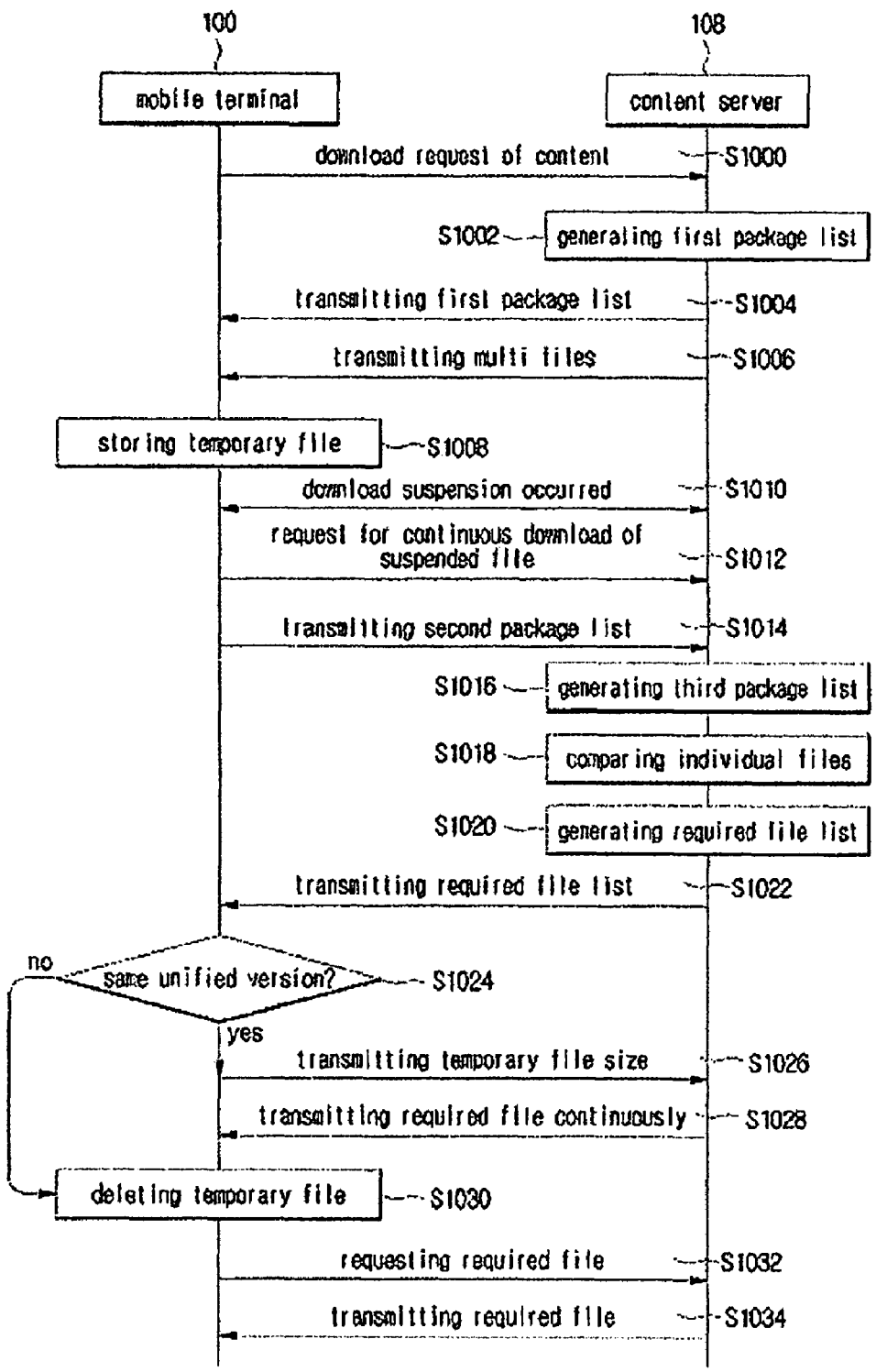

[Figure 11]
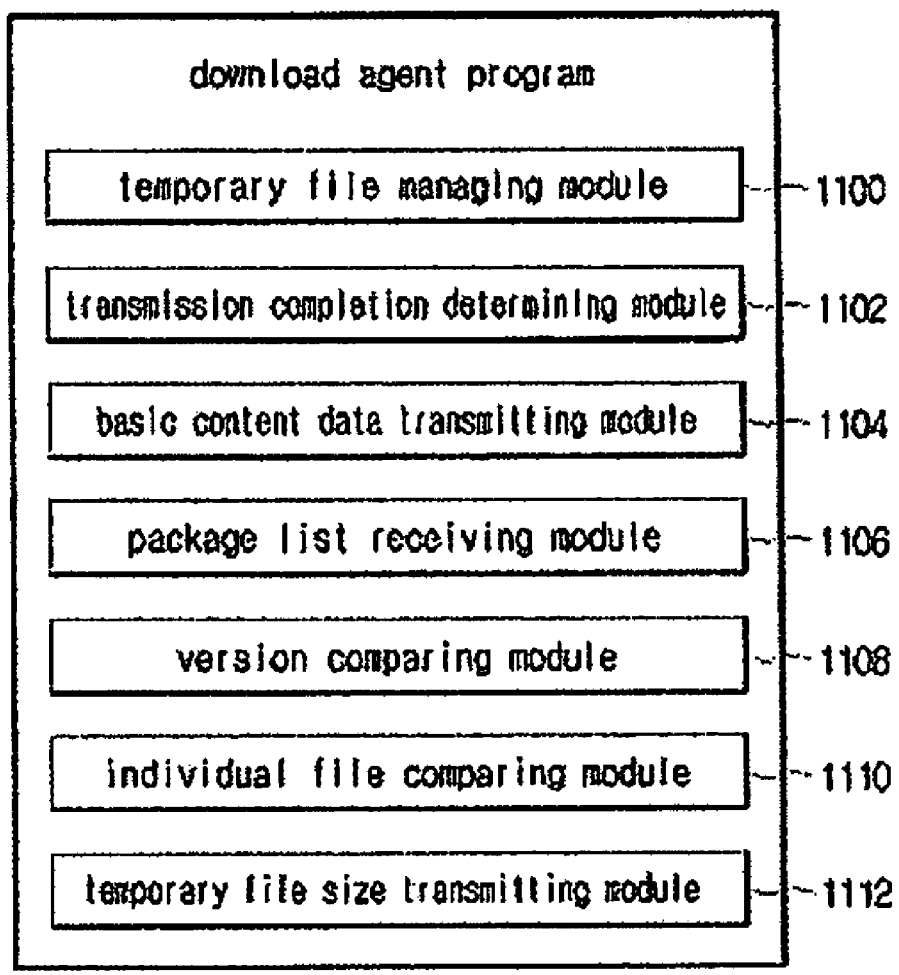

[Figure 12]
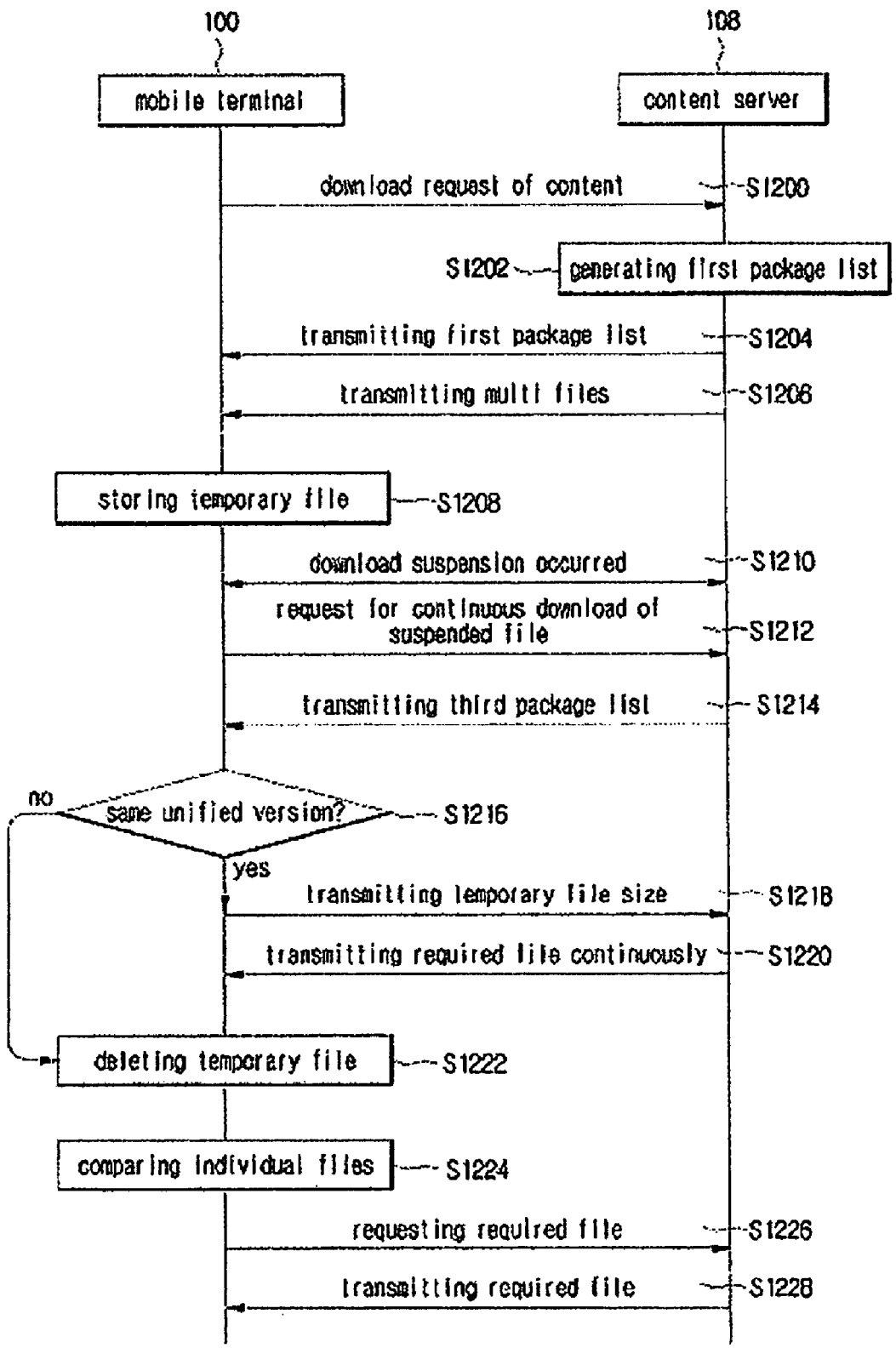

SYSTEM AND METHOD FOR PROVIDING CONTINUOUS DOWNLOADING SERVICE OF LARGE SIZE CONTENTS THROUGH WIRELESS NETWORK AND COMPUTER READABLE MEDIUM FOR REALIZING THE SAME

RELATED APPLICATIONS

This application is a continuation application, and claims the benefit under 35 U.S.C. §§120 and 365 of PCT Application No. PCT/KR2006/001398, filed on Apr. 14, 2006, which is hereby incorporated by reference in its entirety.

BACKGROUND OF THE INVENTION

1. Field of Invention

The present invention relates to data transmission over a wireless network, particularly to a system and method and program-storing media for continuous downloading of large-size content data over a wireless network by managing a temporary file of plural contents and organizing content data into multiple files.

2. Description of the Related Technology

Recently, through the rapid development of the Internet, lots of people have access to a variety of content.

The term content refers to various kinds of information, such as text, music, games and movies and also executable programs for reproducing the above-mentioned content on a user terminal, provided over the Internet.

The content used to be downloaded through the landline Internet and to be played on a desktop PC or a notebook computer. However, with the widespread use of cellular phones, PDAs (Personal Digital Assistants), and the like, the content access by mobile terminals is rapidly increasing.

Currently, it is possible to provide several mega-bytes to several gigabytes of content due to the technological development of multimedia data transmission over the landline Internet and improved performance of desktop PCs or notebook computers, but in providing content to mobile terminals, only small-size content can be sent to mobile terminals due to the limited memory capacity, lagging performance of mobile terminals and instability of wireless networks.

In transmitting content over a wireless network, the content transmission process may be suspended when the mobile terminal leaves the communication coverage or is turned off.

When a user requests content download, which was previously suspended, it is common that a continuous download service to download the remaining part of the file is not available because the size of the content was small.

Although continuous download services are available today, these services are still very much limited because the probability of disconnection increases in proportion to the increase in content size.

Generally, in downloading the content through a wireless network, the mobile terminal stores the data being downloaded in the form of a temporary file and converts it into an executable file after the download is finished.

Since a conventional mobile terminal can accommodate only one temporary file due to its limited memory capacity, it is possible for the mobile terminal to continue the download by using the stored temporary file only when the retransmission request for the suspended content is made right after the suspension occurred. However, the mobile terminal must delete the old temporary file and generate a new temporary file if the user requests to download another content.

Thus, if there is no download request for the suspended content successively, the partially downloaded content must be downloaded from the beginning.

Generally, the charge for the content is made only after finishing the transmission of the content. For example, in downloading a 100-megabyte content file, a wireless communication service provider (hereinafter, carrier) can charge for the content download only when the whole content is downloaded. If 30 megabytes of the 100-megabyte content were downloaded at first and then the remaining 70 megabytes were downloaded by using the continuous download service, the carrier could not charge for these continuous downloads because the first 30 megabytes and the last 70 megabytes were regarded as incomplete downloads of the content.

Also, since the content is usually organized into one file, if there is a patch file for the content, the whole content to which the patch file is applied (hereinafter, patched content) must be downloaded again. However, if the user requests a download of the suspended content and there is a patch file for the requested content, the remaining content will be download first and then the patched content will be download again, making the user download almost the same content twice.

SUMMARY OF CERTAIN INVENTIVE ASPECTS

To overcome the aforementioned shortcomings of prior art, a method and a program-storing medium for providing continuous downloads of more than one large-size content over a wireless network are disclosed.

Another inventive aspect is a method and a program-storing medium for providing continuous downloads of large-size content over a wireless network that makes it possible to charge for the content download even if transmission of the content is suspended.

Still another inventive aspect is a method and a program-storing medium for providing continuous downloads of large-size contents over a wireless network that allows a patch file to be downloaded without downloading the whole patched content.

Yet another aspect is a method of providing a continuous downloading service of large size content through a wireless network consisting of a mobile terminal and a content server, the method comprising: receiving a request for continuous download of content from the mobile terminal, wherein the content consists of plural individual files; receiving a package list from the mobile terminal, wherein the package list comprises a master ID of the content and information of an individual file; comparing information of an individual file in the received package list and information of an individual file in the content server; and transmitting a required file list indicating at least one individual file having different information in the received package list and the stored package list to the mobile terminal, wherein the required file list comprises a content unified version, wherein a download program installed in the mobile terminal receives the required file list and determines the continuous download.

Also, an aspect is a computer readable medium including a program containing computer-executable instructions for performing the method for providing a continuous downloading service of large size content through a wireless network consisting of a mobile terminal and a content server, wherein the program performs the steps of: transmitting a request for continuous download of content to the content server, wherein content consists of plural individual files; receiving a latest package list being stored in the content server, wherein the latest package list comprises a master ID of the content, an unified version and information of an individual file; determining the continuous download based on the unified version.

In certain aspects, since it is possible to manage plural temporary files for downloading plural contents, in case of suspension of content download, a successive request for continuous download right after the suspension happened is not needed any more.

Also, it may be possible to download the latest patch file rather than downloading the remaining part of the suspended file using a unified version in the package list.

BRIEF DESCRIPTION OF THE DRAWINGS

FIG. 1 is block diagram of a content providing system according to embodiment of the present invention;

FIG. 2 is a block diagram of modules consisting of a content server according to embodiment of the present invention;

FIG. 3 is modules consisting of a download agent program according to embodiment of the present invention;

FIG. 4 is a list of package information according to embodiment of the present invention;

FIG. 5 is a list of configuration data of an executable file according to embodiment of the present invention;

FIG. 6 is a list of configuration data of a DLL file according to embodiment of the present invention;

FIG. 7 is a list of configuration data of a resource file according to embodiment of the present invention;

FIG. 8 is a list of configuration data of an item file according to embodiment of the present invention;

FIG. 9 is a diagram showing the layout of a temporary file according to embodiment of the present invention;

FIG. 10 is a flowchart of continuous content download according to one embodiment of the present invention;

FIG. 11 is a block diagram of modules consisting of a download agent program according to another embodiment of the present invention; and FIG. 12 is a flowchart of continuous content download according to another embodiment of the present invention.

DETAILED DESCRIPTION OF CERTAIN INVENTIVE EMBODIMENTS

Hereinafter, embodiments of the system, method and program-storing medium for providing continuous downloads of large-size content over a wireless network according to the present invention will be described in detail with the accompanying drawings.

FIG. 1 is block diagram of a content providing system according to an embodiment of the present invention.

As shown in FIG. 1, the content providing system may comprise a mobile terminal 100 and a content server 108, both of which are connected to each other through a network.

The network may be a wireless network including BTS (Base Transceiver Station), BSC (Base Station Controller) and PDSN (Packet Data Serving Node), and the mobile terminal 100 can access the content server 108 through the above network elements and be provided with various contents from the content server 108.

Generally, content refers to music data or movie data being provided over a network such as the Internet. However, in this specification, the content further comprises an executable file for reproducing the above-mentioned data and link programs (e.g., DLL program). So, the content indicates all data being transmitted through a network.

The mobile terminal 100 can be one of a conventional cellular phone, an MBS (Mobile Broadcast System), and so on.

According to the present invention, the mobile terminal 100 comprises a wireless Internet browser 102, a download agent program 104 and a content storage 106.

The wireless Internet browser 102 for displaying a content list or an item list being provided by the content server 108 can be one of a WAP (Wireless Application Protocol) browser, an ME (Mobile Explorer) and so on.

According to the present invention, the content server 108 organizes the content into several files (hereinafter, multi files or plural individual files) such as an executable file (EXE file), a link file, a resource file (RES), an item file, etc., rather than one file, and stores them. And, if a user requests the download, the content server 108 generates a package list comprising information of multi files and transmits the package list with multi files to the mobile terminal 100.

The executable file is continuously loaded on the memory when certain content is reproducing.

The link file, such as a DLL (Dynamic Library Link) file, is linked to the executable file that uses the link file during the execution rather than compiling with the executable file that is loaded onto the memory of the mobile terminal 100, and is for an efficient use of the memory, reuse of developed software, development for structural software, etc.

In addition, the resource file is, for example, a file for game graphic in case the content is a game, and a skin file in case the content is a reproducing program such as a VOD player.

The item file is for extending the function of resources, such as an extension file of cars or tracks in a racing game or a file for skin change or skin extension in a VOD player.

The package list information comprises a master ID of the content, unified version data, an ID and the size of an executable file, and the number, ID and size of DLL, resource and item files.

After receiving the package list information from the content server 108, the download agent program 104 requests multi files being included in the package list information successively to the content server 108, and checks whether the transmission of each multi file is finished.

At this moment, the download agent program 104 stores the file being downloaded in the form of a temporary file, then renames and stores the file if the download is completed.

According to an embodiment of the present invention, when a user wants continuous download after the content transmission is suspended, the download agent program 104 stores the information on the temporary file such that the continuous download is possible Also, since the download agent program 104 can manage more than one temporary file for plural contents, it is possible to do the continuous download of the previously suspended content even if the request for download is not made right after the suspension happened.

At this moment, the temporary file information, as shown in FIG. 6, may comprise content information, a temporary file ID and the size of the temporary file, and the content information may comprise a master ID and unified version data of the content.

According to an embodiment of the present invention, on receiving the continuous download request, the mobile terminal 100 transmits the stored package list to the content server 108. On receiving the package list, the content server 108 extracts the latest package list for the content and compares the information of individual files in the latest package list with the information of individual files in the received package list to check for disagreement on individual file in each package list. Then the content server 108 generates a required file list based on the disagreement and transmits the required file list to the mobile terminal 100.

Each of the plural individual files may comprise an ID, size and version data, and the disagreement on the information of individual file indicates that two files having the same ID have different sizes or version data. In this case, a patch file or a recovery file (a file that was already downloaded but deleted by a user) will be needed (Hereinafter, a patch file or a recovery file will be referred to as a required file).

The required file list may comprise the latest unified version data of the content being stored in the content server 108, and if the latest unified version data is the same as the unified version of the content being stored in the mobile terminal 100, the continuous download will begin.

In the continuous download according to the present invention, the mobile terminal 100 transmits the size of the file that was suspended and stored in the form of a temporary file to the content server 108, and receives the remaining size of the temporary file successively.

This continuous download can be applied not only to the first suspended transmission of the content download but also to the suspended transmission of the patch file or extension package.

In addition, according to another embodiment of the present invention, a comparing process of individual files for continuous download can be performed in the mobile terminal 100.

That is, on receiving the continuous download request, the download agent program 104 of the mobile terminal 100 receives the latest package list from the content server 108 and compares the information of individual files in the latest package list with the information of individual files in the received package list. If the unified version data in the latest packet list is the same as the unified version data in the mobile terminal 100, the continuous download will be performed.

in addition, on receiving the continuous download request, if there is a patch file and the version of the content is updated, the download of patch file or recovery file will be performed rather than the continuous download of the content.

According to one embodiment of the present invention, if the unified version of the required file list being received from the content server 108 is different from the unified version data of the content already stored in the mobile terminal 100, the download agent program 104 deletes the stored temporary file and starts to download and store the required file.

In addition, according to one embodiment of the present invention, if the unified version of the latest package list being received from the content server 108 is different from the unified version data of the content already stored in the mobile terminal 100, the download agent program 104 deletes the stored temporary file and starts to download and store the required file.

The content storage 106 stores all kinds of contents downloaded from the content server 108, and may be an internal memory of the mobile terminal 100 or an external memory for storing large-size contents.

FIG. 2 shows modules consisting of the content server according to an embodiment of the present invention.

As shown in FIG. 2, the content server 108 according to the present invention comprises a content list providing module 200, a package list generating module 202, a version comparing module 204, an individual file comparing module 206, a COD (Compile On Demand) module 208, an encryption module 210, an application transmitting module 212, a resource transmitting module 214, an authentication key providing module 216 and a billing module.

The content list providing module 200 provides a content list and item list to the mobile terminal being connected to the content server 108. The content list providing module 200 can be included within the content server, but it can be implemented as an independent server.

The package list generating module 202 generates a package list for multi files consisting of certain contents.

The content server 108 according to the present invention organizes the content to be downloaded to the mobile terminal 100 into multi files, and generates a package list for these multi files.

FIG. 4 shows the package list information according to an embodiment of the present invention. As shown in FIG. 4, the package list information according to the present invention comprises a content master ID, a content unified version, the number of executable files, executable file configuration data, the number of DLL files, DLL file configuration data, the number of resource files, resource file configuration data, the number of item files and item file configuration data.

The content master ID is a content identifier, and the content unified version indicates that certain content is a basic package or an extension package and shows a patch version status.

According to an embodiment of the present invention, it is preferable that the number of executable file is one. Configuration data of the executable file may comprise, for one executable file, as shown in FIG. 5, an executable file ID, version data, the size and billing data.

Content unified version data can be represented in the form of major/middle/minor such as 1xx or 2xx. The major number is an identification number for identifying the basic package or extension package, and middle and minor numbers are for identifying the patch.

In addition, the number of DLL files, resource files and item files depends on the kind of content, and each configuration data, as shown in FIGS. 6-8, comprises an ID of each file, version data, the size and billing data.

In addition, the item file is for extending resources and does not need to be included in the first download of the content.

The package list generating module 202 according to the present invention generates a packet list having information of multi files on receiving a content request and sends it to the content list providing module 200, and the content list providing module 200 transmits the package list information to the mobile terminal 100.

Additionally, in order to avoid confusion of the terms, the package list to be downloaded to the mobile terminal 100 before requesting the continuous download will be defined as the first package list, the package list to be downloaded stored in the mobile terminal and to be transmitted to the content server on requesting the continuous download will be defined as the second package list, and the latest package list to be extracted from the content server 108 and to be downloaded to the mobile terminal 100 will be defined as the third package list.

The second package list and the first package list will be identical.

Then, when the downloading of multi files starts, the download agent program 104 of the mobile terminal 100 checks all multi files included in the package list that was already provided, and stores the file being downloaded in the form of a temporary file.

Also, the download agent program 104 of the present invention designates a folder for plural contents to store the temporary file.

According to an embodiment of the present invention, when a user wants the continuous download of the previously suspended file, the download agent program 104 will transmit the second package list to the content server 108.

In one embodiment of the present invention, the second package list may comprise a content master ID.

At this moment, the version comparing module 204 of the content server 108 will compare unified version data in the second package list and unified version data in the third package list.

Then, the individual file comparing module 206 compares information of individual files in the second package list and information of individual file in the third package list, and generates a required file list.

The mobile terminal 100 receives the required file list and requests download of individual files included in the required file list to the content server 108. If the continuous download is needed due to the same unified version, the mobile terminal 100 transmits the size data of the already stored temporary file to the content server 108. The content server 108 transmits the remaining size of the temporary file to the mobile terminal 100, and also transmits multi files in a lower level than the suspended temporary file to accomplish the continuous download.

The COD module 208 compiles an executable file and an DLL file needed to be compiled among multi files.

The COD module 208 is a key component of WIPI (Wireless Internet Platform for Interoperability) for the wireless Internet platform standard under discussion.

According to the present invention, the executable file or the DLL file among multi files consisting of the content needs to be complied, and the COD module 208 will compile these kinds of files.

The encryption module 210 encodes each multi file, if necessary.

The application transmitting module 212 transmits an executable file and a DLL file among multi files to the mobile terminal 100. Namely, the game application transmitting module 212 transmits the compiled file such as an executable file and a DLL file that the COD module 208 compiled.

The resource transmitting module 214 transmits a resource file and an item file, both of which do not need to be compiled, to the mobile terminal 100.

An item file is for extension of resources, such as, for example, a graphic expression extension of game, an additional skin of each player, etc., and there is no need to download the item file at the first content download.

When a carrier provides the content in the previous way, whole files were compiled into one file, and then the compiled file was transmitted. In this case, the carrier that operates the content server could not provide files that were not compiled at the same time.

However, according to the present invention, it becomes possible to transmit a compiled file and a resource file that do not need to be compiled such that it also becomes possible for a carrier to transmit multi files at one time by using the package list information.

The authentication key providing module 216 transmits an authentication key, for decoding the encoded files for content protection, to the mobile terminal 100.

The billing module charges the files being downloaded to the mobile terminal 100.

Conventionally, an individual content was consisted of one file, and it was possible to charge the content download only when the download of the whole content was completed by checking the size of the content. However, since different parts of the individual content were downloaded at different times in case of the continuous download, it is impossible for the carrier to charge each download because the carrier regarded each download as an incomplete download.

However, according to the present invention, since one content is organized into multi files, it is possible to use various charge policies. For example, in case of charging a basic fee for the first downloaded content, when the download of the first file among multi files included in the package list is completed, it is possible to charge the basic fee for the whole content and not to charge for remaining files to be downloaded by treating these remaining files as exceptional cases.

Even if there is a continuous download request for the content, the basic fee was already charged so that it becomes possible to avoid charging for the continuous download again.

Also, in case of charging for the download of the content in proportion to the amount of packets, since the content according to the present invention is organized into several small files and multi files that include the billing data respectively, it becomes easier to check whether the download of each multi file is complete and possible to charge for each multi file individually.

In addition, although it was described that the modules in the content server 108 provide the content according to the users request, this is merely one embodiment of the present invention, and each module can be included in different servers in an alternative embodiment.

Also, although it was described that part of the temporary file or multi files having a lower level than the temporary file were downloaded when the multi files organizing one content were downloaded continuously, and the download of one of the multi files was suspended, this is merely one embodiment of the present invention, and it is possible to download multi files randomly. And it is also possible to download a file that is not downloaded through comparing the sizes of individual multi files included in the second package list and the third package list one by one.

FIG. 3 shows modules consisting of the download agent program according to an embodiment of the present invention.

As shown in FIG. 3, the download agent program according to the present invention comprises a temporary file managing module 300, a transmission completion determining module 302, a package list transmitting module 304, a required file list receiving module 306, a version comparing module 308 and a temporary file size transmitting module 310.

When downloading multi files consisting of one content, the temporary file managing module 300 stores the file being downloaded in the form of a temporary file, and renames the temporary file after completing the download to store it as an actual file.

Also, in case of suspending the download of multi files, the temporary file managing module 300 stores the information about the suspended temporary file to enable the downloading the remaining amount of the temporary file from the content server 108.

In addition, as described above, even if there is a request for continuous download, the request will be discarded and the latest patch file will be downloaded if the content unified versions of the second package list and required file list are not the same. In this case, the temporary file managing module 300 deletes the stored temporary file.

However, in case the unified versions are not the same, it is possible to ask the user whether he or she wants to download the latest patch file, and it is preferable to delete the stored temporary file and receive the patch file only when the user selects to download the patch file.

According to the present invention, the temporary file managing module 300 stores temporary files of each content by assigning plural contents to plural individual folders and, if there is a request for continuous download of one of the plural contents, stores the remaining part of the requested content in the folder where the temporary file corresponding to the requested content was already stored in.

Thus, according to the present invention, the continuous download becomes possible unless the request was made right after the suspension happened.

The transmission completion determining module 302 checks whether the download of all multi files included in the package list being sent from the content server 108 is completed.

When the content server 108 compares the information of individual files according to one embodiment of the present invention, the package list transmitting module 304 sends the package list of the content (the second package list) stored in the mobile terminal content server 108 to the content server 108.

According to one embodiment of the present invention, the second package list to be sent to the content server 108 may comprise a master ID of the content, an ID, the size and individual version data of each individual file.

After comparing the information of individual files, the content server 108 generates a list of files (the required file list) to be downloaded to the mobile terminal 100, and the required file list receiving module 306 receives the required file list.

The version comparing module 308 checks whether the unified version data in the required file list and the second package list are the same to determine whether or not to perform the continuous download.

If the continuous download is required because the unified versions are the same, the temporary file size transmitting module 310 transmits the size data of the suspended temporary file to the content server 108. By using the size data, the content server 108 can download the remaining part of the temporary file.

FIG. 10 is a flowchart of continuous content download according to one embodiment of the present invention.

Referring to FIG. 10, the mobile terminal 100 requests the download of a specific content to the content server 108 (S1000). The download request for the content may comprise a first request for the content and a download request for a patch and an extension package of the content that is already stored in the mobile terminal 100.

According to the download request from the mobile terminal 100, the content server 108 generates the first package list information about multi files consisting of one content (S1002), and then transmits it to the mobile terminal (S1004).

Then, the content server 108 downloads multi files being included in the first package list to the mobile terminal 100 (S1006), and the mobile terminal 100 stores the multi file being downloaded in the form of a temporary file (S1008).

As described above, when each download of multi files is completed, the mobile terminal 100 renames the download-completed temporary file by an actual file name to store.

If the download is suspended due to instability of a wireless network during the download of multi files (S1010), the mobile terminal 100 transmits the request for continuous download of the suspended file to the content server 108 (S1012).

According to one embodiment of the present invention, since the content server 108 compares information of individual files, the mobile terminal 100 transmits the second package list comprising a content master ID, and an ID, the size and individual version data of individual files to the content server 108 (S1014) when receiving the request of continuous download.

After receiving the second package list, the content server 108 extracts the third package list of the requested content stored thereon (S1016), and compares information of individual files in the second package list and the third package list (S1018).

Through the individual file comparing process, the content server 108 generates a required file list (S1020), and transmits the required file list to the mobile terminal 100 (S1022).

The mobile terminal 100 check whether the unified version of the required file list and unified version of the content already stored in the mobile terminal 100 are the same (S1024).

In case the unified versions are the same, the continuous download will be performed, that is, the mobile terminal 100 transmits the size data of the temporary file to the content server 108 (S1026), and the content server 108 downloads the required file successively. The continuous download of the required file is downloading the remaining part of the temporary file and other files in a lower order than the temporary file.

However, in case the unified versions are different in step S1024, the mobile terminal 100 deletes the stored temporary file (S1030), then requests for the required file list to the content server 108 (S1032). The content server 108 downloads required file to the mobile terminal 100 (S1034).

FIG. 11 shows modules consisting of the download agent program according to another embodiment of the present invention.

FIG. 11 shows that the download agent program compares information of individual files when the user requests for the continuous download. As shown in FIG. 11, the download agent program according to another embodiment of the present invention comprises a temporary file managing module 1100, a transmission completion determining module 1102, a basic content data transmitting module 1104, a package list receiving module 1106, a version comparing module 1106, an individual file comparing module 1108 and a temporary file size transmitting module 1112.

The temporary file managing module, the transmission completion determining module and the temporary file size transmitting module are already described in FIG. 3, so the same description will be omitted.

When the user requests for the continuous download such that the basic content data transmitting module 1104 transmits the basic content data comprising a master ID of the content for continuous download to the content server 108 in order that the content server compares the unified versions.

The content server 108 extracts the third package list information of the requested content using the content master ID received from the mobile terminal 100, and transmits to the mobile terminal 100, and the package list receiving module 1106 receives it.

According to the present invention, the mobile terminal 100 is storing the second package list at the moment of downloading the content, and the version comparing module 1108 compares the unified version in the second package list and the unified version in the third package list being transmitted from the content server 108.

If the unified versions are not the same, the temporary file managing module 1100 deletes the already-stored temporary file.

The individual file comparing module 810 compares information of individual files in the third package list and information of individual files in the mobile terminal 100, and can request for a file download to the content server 108 if the information of individual files is not same.

FIG. 12 is a flowchart of continuous content download according to another embodiment of the present invention.

Referring to FIG. 12, the mobile terminal 100 requests for the content download to the content server 108 (S1200), and the content server 108 generates the first package list for the requested content (S1202) and transmits it to the mobile terminal 100 (S1204).

Then, the content server 108 downloads multi files included in the first package list to the mobile terminal 100 (S1206), and the mobile terminal stores the multi files being downloaded in the form of a temporary file (S1208).

The download is suspended due to instability of a wireless network during the download of multi files (S1210), and if the mobile terminal 100 transmits the request of continuous download to the content server 108 (S1212), the content server 108 transmits the third package list of the content currently stored in the content server 108 to the mobile terminal (S1214).

On receiving the third package list, the mobile terminal 100 compares the unified version of the content stored thereon and the unified version in the third package list (S1216).

In case the unified versions are the same, the mobile terminal 100 transmits the size data of the temporary file stored thereon to the content server 108 (S1218), and the content server 108 downloads the required file (S1220).

However, in case the unified versions are different in step S916, the mobile terminal 100 deletes the stored temporary file (S1222) because the latest patch file must be downloaded if the versions are not the same.

As described above, in case the versions are different, the mobile terminal may ask to the user whether he or she wants to download the latest patch file, and then can delete the temporary file if the user wants to download the patch file.

For the request for a required file, the mobile terminal 100 compares the third package list from the content server 108 and information of individual files being stored thereon (S1224), and then requests for the download of files, of which the information is not the same, to the content server 108 (S1226).

According to the mobile terminal 100, the content server 108 transmits the requested patch file (S1228). Another embodiment is a computer readable medium including a program containing computer-executable instructions for performing the method for providing a continuous downloading service of large size content through a wireless network comprising a mobile terminal and a content server. The program performs the method comprising: i) transmitting a request for a continuous download of content to the content server, wherein content comprises a plurality of individual files, ii) receiving a latest package list being stored in the content server, wherein the latest package list comprises a master identifier of the content, an unified version, and the information of at least part of the individual files and iii) determining the continuous download based on the unified version. In the above medium, the individual files being downloaded from the content server are stored in the form of a temporary file, wherein the temporary file data comprising at least one of identifier, size, and version of the temporary file is stored if the download is suspended. In the above medium, the method further comprises: transmitting the temporary file data to the content server when the unified version in the latest package list and the unified version stored in the mobile terminal are the same. In the above medium, the temporary file is deleted when the unified version in the latest package list and the unified version stored in the mobile terminal are the same. In the above medium, the method further comprises: designating each of a plurality of contents to an individual folder and continuing to store temporary files of the plurality of contents.

The aforementioned embodiments are only for describing the present invention, so those who are skilled in the art can make various changes, alternatives and addition to the present invention without departing from the spirits and scope of the present invention, and these changes, alternatives and addition must be interpreted as being involved to the following claims.

What is claimed is:

1. A method of providing a continuous downloading service of large size content through a wireless network comprising a mobile terminal and a content server, the method comprising:
    receiving a request from the mobile terminal for downloading content, wherein the content comprises a plurality of individual files;
    generating and transmitting a first package list for the requested content to the mobile terminal;
    downloading the individual files included in the first package list to the mobile terminal;
    if the download is suspended, receiving i) a request for a continuous download of the content and ii) a second package list from the mobile terminal;
    extracting a third package list for the requested content, wherein the third package list is the latest package list of the requested content stored in the content server;
    comparing information of individual files in the second package list and the third package list;
    generating a first required file list including at least one individual file having different information in the second package list and the third package list;
    transmitting the first required file list to the mobile terminal;
    receiving one of i) size data of a temporary file previously downloaded to the mobile terminal and ii) a second required file list including at least one file from the mobile terminal; and
    downloading one of i) the remaining portion of the temporary file and ii) the at least one file of the second required file list to the mobile terminal.

2. The method of claim 1, wherein the individual files comprise at least one from a group consisting of an executable file, a DLL (Dynamic Link Library) file and a resource file.

3. The method of claim 1, wherein the information of each of the individual files comprises an individual file size or an individual file version.

4. The method of claim 1, wherein a download agent program installed in the mobile terminal receives the first required file list and determines the continuous download, and wherein the download agent program performs the continuous download when a content unified version in the first required file list and a content unified version stored in the mobile terminal are the same, and wherein the download agent program stores the size data of the temporary file comprising at least part of an individual file suspended during transmission from the content server.

5. The method of claim 4, wherein the download agent program deletes the temporary file when the unified version data is not the same.

6. A computer readable medium including a program containing computer-executable instructions for performing the method for providing a continuous downloading service of large size content through a wireless network comprising a mobile terminal and a content server, wherein the program performs the method comprising:

receiving a request from the mobile terminal for downloading content, wherein the content comprises a plurality of individual files;

generating and transmitting a first package list for the requested content to the mobile terminal;

downloading the individual files included in the first package list to the mobile terminal;

if the download is suspended, receiving i) a request for a continuous download of the content and ii) a second package list from the mobile terminal;

extracting a third package list for the requested content, wherein the third package list is the latest package list of the requested content stored in the content server;

comparing information of individual files in the second package list and the third package list;

generating a first required file list including at least one individual file having different information in the second package list and the third package list;

transmitting the first required file list to the mobile terminal;

receiving one of i) size data of a temporary file previously downloaded to the mobile terminal and ii) a second required file list including at least one file from the mobile terminal; and downloading one of i) the remaining portion of the temporary file and ii) the at least one file of the second required file list to the mobile terminal.

7. The computer readable medium of claim 6, wherein the individual files being downloaded from the content server are stored in the form of the temporary file, and wherein the temporary file data comprising at least one of identifier, size, and version of the temporary file is stored if the download is suspended.

8. The computer readable medium of claim 7, further comprising: transmitting the temporary file data to the content server when a unified version in the latest package list and a unified version stored in the mobile terminal are the same.

9. The computer readable medium of claim 7, wherein the temporary file is deleted when a unified version in the latest package list and a unified version stored in the mobile terminal are not the same.

10. The computer readable medium of claim 6, further comprising:

designating each of a plurality of contents to an individual folder and continuing to store temporary files of the plurality of contents.

11. A method for downloading content through a network comprising a mobile terminal and a content server, the method comprising:

establishing a transmission between the content server and the mobile terminal;

receiving a request from the mobile terminal for downloading content, wherein the content comprises a plurality of individual files;

generating and transmitting a first package list for the requested content to the mobile terminal;

downloading the individual files included in the first package list to the mobile terminal;

if the download is suspended, receiving i) a request for a continuous download of the content and ii) a second package list from the mobile terminal;

extracting a third package list for the requested content, wherein the third package list is the latest package list of the requested content stored in the content server;

comparing information of individual files in the second package list and the third package list;

generating a first required file list including at least one individual file having different information in the second package list and the third package list;

transmitting the first required file list to the mobile terminal;

receiving one of i) size data of a temporary file previously downloaded to the mobile terminal and ii) a second required file list including at least one file from the mobile terminal; and downloading one of i) the remaining portion of the temporary file and ii) the at least one file of the second required file list to the mobile terminal.

12. The method of claim 11, wherein the plurality of individual files comprise at least one from a group consisting of an executable file, a DLL (Dynamic Library Link) file and a resource file.

13. The method of claim 11, wherein the information of each of the plurality of individual files comprises an individual file size or an individual file version.

14. The method of claim 11, wherein the mobile terminal stores the size data of the temporary file comprising at least part of an individual file suspended during transmission from the content server.

15. The method of claim 14, wherein the mobile terminal deletes the temporary file when a unified version in the latest package list and a unified version stored in the mobile terminal are not the same.

16. A system for downloading content through a network comprising a mobile terminal and a content server, the system comprising:

means for receiving a request from the mobile terminal for downloading content, wherein the content comprises a plurality of individual files;

means for generating and transmitting a first package list for the requested content to the mobile terminal;

means for downloading the individual files included in the first package list to the mobile terminal;

means for, if the download is suspended, receiving i) a request for a continuous download of the content and ii) a second package list from the mobile terminal;

means for extracting a third package list for the requested content, wherein the third package list is the latest package list of the requested content stored in the content server;

means for comparing information of individual files in the second package list and the third package list;

means for generating a first required file list including at least one individual file having different information in the second package list and the third package list;

means for transmitting the first required file list to the mobile terminal;

means for receiving one of i) size data of a temporary file previously downloaded to the mobile terminal and ii) a second required file list including at least one file from the mobile terminal; and means for downloading one of i) the remaining portion of the temporary file and ii) the at least one file of the second required file list to the mobile terminal.

* * * * *